United States Patent [19]
Neilson

[11] 4,231,464
[45] Nov. 4, 1980

[54] CONVEYOR WITH LATERALLY ADJUSTABLE FLIGHTS

[75] Inventor: Jay C. Neilson, Lakewood, Colo.

[73] Assignee: Kockum Industries, Inc., Talladega, Ala.

[21] Appl. No.: 3,213

[22] Filed: Jan. 15, 1979

[51] Int. Cl.³ .................... B65G 17/30; B65G 47/22
[52] U.S. Cl. .................................. 198/456; 198/822; 198/631
[58] Field of Search ............... 198/376, 377, 401, 411, 198/412, 456, 645, 648, 688, 822, 802, 631; 144/1 R, 39, 242 R, 242 D, 312; 83/368, 420, 435.2, 732

[56] References Cited

U.S. PATENT DOCUMENTS

| | | |
|---|---|---|
| 343,328 | 6/1886 | Lynch . |
| 503,908 | 8/1893 | Hahn . |
| 857,757 | 6/1907 | Reid . |
| 1,804,764 | 5/1931 | Grant . |
| 3,129,803 | 4/1964 | Giulie et al. ........................ 198/802 |
| 3,319,773 | 5/1967 | Tannerstal . |
| 3,356,205 | 12/1967 | McLeod . |
| 3,519,045 | 7/1970 | Blickenderfer et al. . |
| 3,552,457 | 1/1971 | Bos . |
| 3,580,379 | 5/1971 | Shuster ........................ 198/412 X |
| 3,608,700 | 9/1971 | Nilsson . |
| 3,665,984 | 5/1972 | Reed . |
| 3,970,128 | 7/1976 | Kohlberg ........................ 144/312 X |
| 3,971,423 | 7/1976 | Miller ........................ 144/242 R X |
| 3,987,888 | 10/1976 | Wickam ........................ 198/802 |

Primary Examiner—Jeffrey V. Nase

[57] ABSTRACT

An infeed conveyor feeds logs lengthwise toward a sawing, chipping or other log processing machine. The infeed conveyor has two endless conveyor chains which circulate in an infeed conveyor path carrying flights along low-friction guides. To assist in obtaining optimum lumber recovery from logs, each flight has a load-engaging portion for cradling logs which is movable transversely of the infeed path so that a tapered log is laterally and angularly positioned as desired with respect to the centerline of the moving conveyor. Line bars along the conveyor, moved by manually or automatically-actuated cylinders engage the load-engaging portion of the flights to shift them and a supported log laterally to a desired alignment. The load-engaging portion of each flight is held in an adjusted lateral position after the line bars retract by friction blocks compressed between the load-engaging portion and the base portion. The load-engaging portion has low-friction bearing pads which slidingly support it on stationary support surfaces of the conveyor frame as a log is conveyed.

17 Claims, 7 Drawing Figures

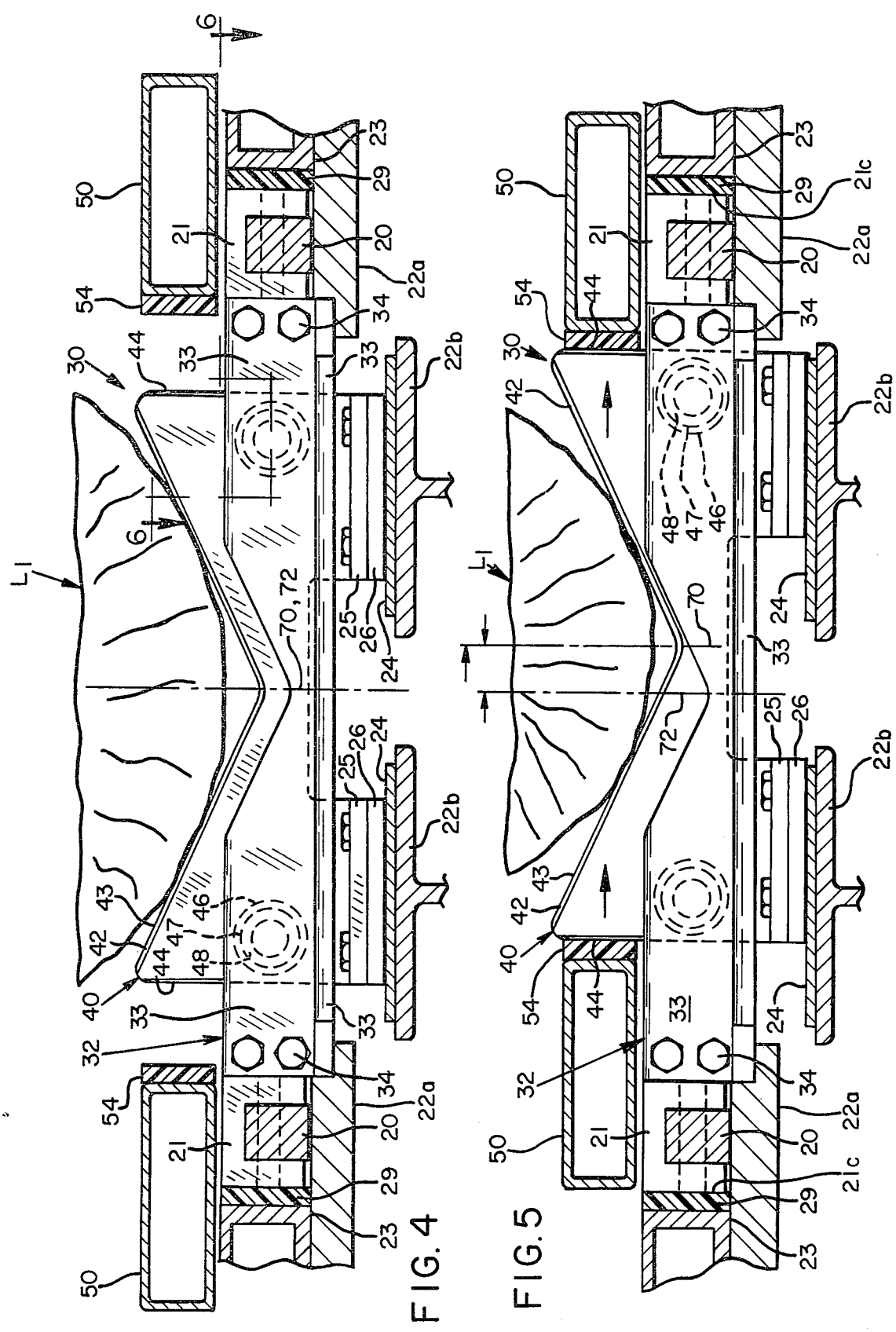

CONVEYOR WITH LATERALLY ADJUSTABLE FLIGHTS

BACKGROUND OF THE INVENTION

1. Field of the Invention

This invention relates generally to conveyors for feeding logs into a sawmill or other log processing machines and more particularly to an infeed conveyor having laterally adjustable flights and cooperative adjustment mechanism for angularly and laterally repositioning logs for optimum recovery during the infeed process.

2. Description of the Prior Art

As the cost of lumber has increased, it has become increasingly necessary to optimize lumber recovery from logs of varying sizes and shapes. In addition, economics dictates that such recovery be performed in a highly efficient operation with a large volume output. Therefore, to obtain optimum recovery of useful lumber at relatively high efficiencies, log processing must, to some extent, be automated.

It has previously been recognized that optimum yield of useful lumber cannot always be achieved by sawing a tapered log along its centerline. By "taper sawing", "offset-center sawing" or "offset-taper sawing" irregularly shaped logs, lumber recovery can be improved. Blickenderfer, et al, U.S. Pat. No. 3,519,045, recognize the advantage of aligning a log for sawing along lines other than the centerline of the log. To perform such alignment, Blickenderfer employs a log alignment structure separate from and alongside an infeed conveyor. Logs are received and aligned on this structure and then transferred to the conveyor for infeeding into a log processing stage. Although the Blickenderfer apparatus appears capable of meeting the speed requirements of a modern, high-efficiency lumber mill, it does so with considerable complexity and expense in the alignment apparatus. It would be preferable to use the infeed conveyor itself to align the logs as they move along the conveyor, and thereby meet the speed and efficiency requirements of a modern sawmill while minimizing the cost and complexity of alignment machinery.

Several devices have been used for percentering logs on a conveyor for processing, but they are not useful for deliberately off-setting a log laterally or angularly with respect to a conveyor. Hahn, U.S. Pat. No. 503,908, discloses a cable-mounted flight wherein a log is centered between V-shaped members of such a flight, but such flight has no lateral adjustment means. Nilsson U.S. Pat. No. 3,608,700, discloses a log conveyor with laterally-movable log grippers and a V-shaped groove longitudinally disposed along the centerline of the conveyor, but such grippers and grooves are not laterally adjustable for orientation of a log either angularly or laterally on the conveyor.

Tannerstal, U.S. Pat. No. 3,319,773, and McLeod, U.S. Pat. No. 3,356,205, both disclose V-shaped log conveyors intended to center a log for sawing, but neither device discloses any lateral adjustment feature.

Noriyuki, et al, U.S. Pat. No. 3,895,662, and Reed, U.S. Pat. No. 3,664,395, disclose log precentering devices for veneer lathes, both employing V-shaped blocks for holding a log, but in neither device are such blocks used in connection with a log conveyor.

Andersson, et al, U.S. Pat. No. 3,858,631, discloses a device for centering logs in a fixed position between a rollertype conveyor system and a sawing stage, rather than moving integrally with a chain-type conveyor.

Three devices disclose means for laterally or angularly positioning a log in an infeed conveyor system but none of them meets present sawmill requirements. Lynch, U.S. Pat. No. 343,328, shows a longitudinally static log trough used to position logs for entry into a sawing stage. The trough comprises two V's longitudinally disposed above a conveyor. Each such V is adjusted laterally to position a log held thereon so that one side of the log substantially parallels the conveyor. Once positioned, the log, which has been stationary in the trough while being laterally positioned, is engaged by dogs on the conveyor and carried into the slabbing machine, the trough remaining in position.

However, Lynch's design is too inefficient for use in a modern lumber mill. Time is lost placing a log in the trough and aligning it before it resumes its journey to the next stage. Then the conveyor must remove the aligned log from the trough before the trough can receive a succeeding log, resulting in further time loss.

Ackerfeldt, U.S. Pat. No. 3,665,984, shows a log-positioning system wherein three gripping devices are used to position curved logs on a conveyor for cutting. The gripping device nearest the cutting machine remains longitudinally static while the other two gripping devices are longitudinally adjustable to the length of the log in process. All three gripping devices are transversely movable on overhead frames above the conveyor. Each gripping device uses a pair of downwardly extending arms which cooperate to grasp a log and hold it while the carriages traverse the overhead frame positioning the log. Once the log is positioned, the gripping arms release it onto the conveyor to be carried into the sawing stage. Again, time is lost during the alignment of a log. In addition, Ackerfeldt's invention lacks means for holding a log in position, once aligned, securely enough to resist the lateral forces of some lumber processing machines, such as chipping edgers.

Grant, U.S. Pat. No. 1,804,764, discloses a log-bearing, track-mounted carriage having log bearing head blocks which are movable transversely of the carriage, but not while the carriage is moving.

All of the above devices have the common failing of requiring an interruption in the infeed travel of a log in order to reposition it for optimum lumber recovery, thereby making lumber production slower than it might otherwise be should it be possible to reposition the log as it moves on an infeed conveyor toward the log-processing machinery.

SUMMARY OF THE INVENTION

The present invention is a laterally adjustable flight for an infeed conveyor and a conveyor employing a plurality of such flights spaced therealong together with means for lateral adjustment of such flights, whereby a log supported on such flights can be laterally and angularly repositioned.

The invention features an infeed conveyor system wherein a log is firmly supported upon two or more flights of the moving conveyor and is laterally and angularly positioned for proper presentation to a sawing or other log processing stage.

The primary object of the invention is to speed up lumber production and optimize lumber recovery by providing for angular and lateral repositioning of logs held on a moving infeed conveyor.

Another object of the invention is to provide an infeed conveyor with flights which are movable transversely of the conveyor path.

A further object is to provide flights which are movable to selectable lateral positions on the conveyor while supporting a log and which will retain the selected position as the log is fed into a processing stage.

Yet another object of the invention is to laterally position one or more conveyor flights without disrupting movement of the conveyor.

Another object is to provide the conveyor with low friction contacting surfaces between the flights and the stationary conveyor framework.

Additional objects include:

(1) automatic actuation of log repositioning means;

(2) lateral positioning of log-bearing flights while the conveyor retains a centered position on its framework;

(3) simultaneous positioning of multiple flights to selected lateral positions;

(4) adaptability to logs of different lengths; and (5) simplicity and ease of operation.

The foregoing and other objects, features and advantages of the present invention will become more apparent in the following detailed description which proceeds with reference to the accompanying drawings.

BRIEF DESCRIPTION OF THE DRAWINGS

FIG. 4 is a cross-sectional view taken along line 4—4 in FIG. 1.

FIG. 5 is a cross-sectional view taken along line 5—5 in FIG. 2.

DETAILED DESCRIPTION OF PREFERRED EMBODIMENT

General Arrangement

Figure 1:
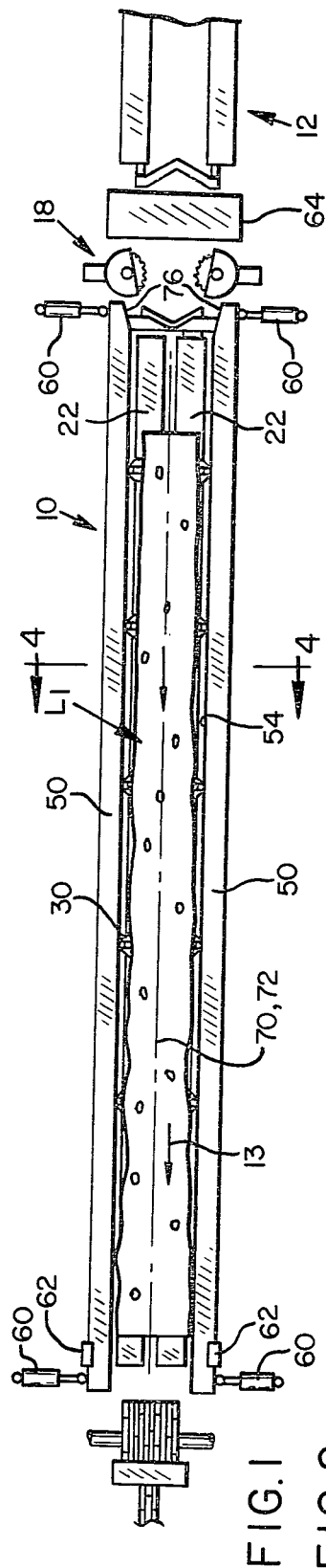
FIGS. 1-3 are top views of a preferred embodiment of a conveyor according to the present invention showing a log in various stages of progression along and alignment on the conveyor. The conveyor is shown together with examples of preceding and succeeding lumber mill stages with which it can be used.
Figure 2:
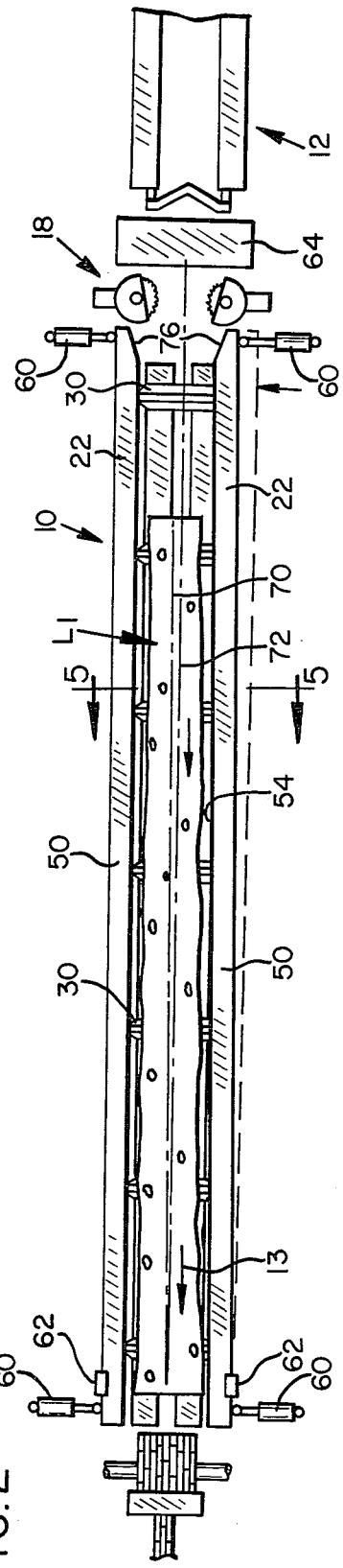
Figure 3:
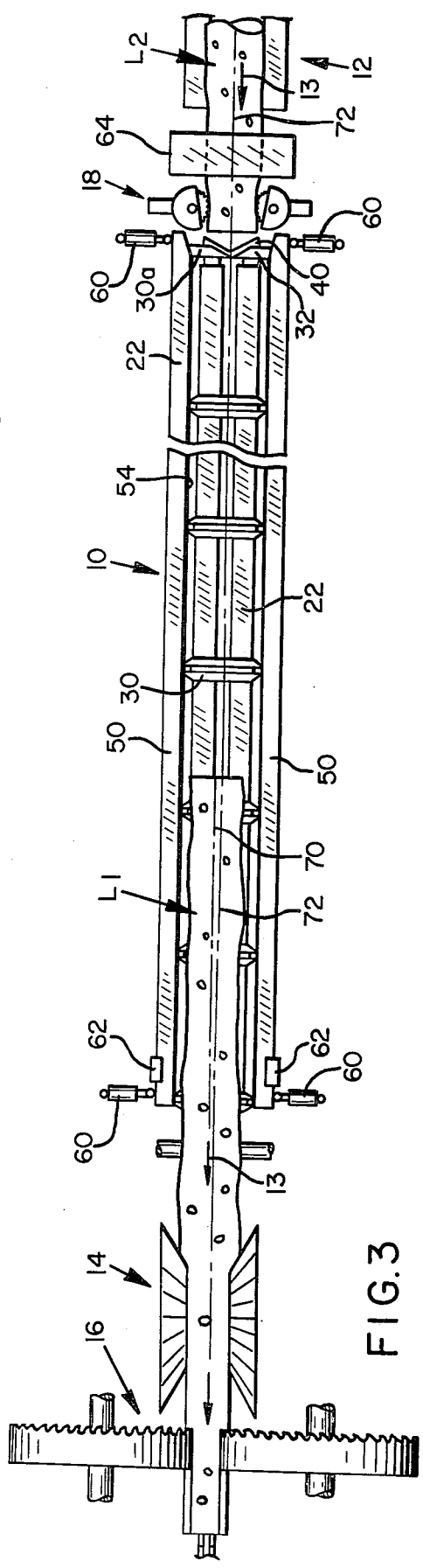

Referring to FIGS. 1-3, a conveyor system 10, according to the invention, is shown as an element in a lumber mill, arranged to receive logs L1, L2 from an upstream conveyor such as the standard Boxholm conveyor 12 partially depicted in the drawing, and to transport logs L1, L2 to a downstream lumber processing stage, such as the chipping edgers 14 and band saws 16 depicted in FIG. 3. Also shown upstream of the conveyor 10 are flying log rotators 18 of a type commonly used for rotationally positioning a log L2 for processing.

The conveyor system 10 includes endless flexible conveyor means comprising, in the preferred embodiment, a pair of endless conveyor chains 20 (FIG. 6) circulating in a conveyor path about a longitudinally elongated frame 22, best seen in FIGS. 4 and 5. A plurality of conveyor flights 30 are mounted transversely on the chains 20 and circulate integrally with the chains 20 about the conveyor frame 22. Each flight 30 includes a base portion 32 and a load-engaging portion 40 movable transversely relative to the base portion.

Flight positioning means include a pair of line bars 50 laterally positioned on opposite sides of the conveyor path. The line bars 50 are shown in FIGS. 1, 3 and 4 in a retracted position approximately parallel to and above the conveyor chains 20. In FIGS. 2 and 5 the line bars 50 are shown in position for slidingly engaging and pushing the load-engaging portions 40 of multiple flights 30. Although in the present embodiment a single pair of line bars 50 are used to simultaneously adjust all of the flights on the upper side of the conveyor, multiple shorter pairs can be used to adjust fewer of such flights, particularly where logs of relatively shorter length are to be processed. Similarly, it is obvious that other forms of flight positioning means may be employed within the spirit of the present invention.

The line bars 50 are moved laterally by powered means such as pneumatic or hydraulic cylinders 60. Such cylinders can be actuated manually, but preferably their operation is actuated by control means including photocell sensors 62 and a log shape sensor 64 such as the standard log diameter scanning systems manufactured by Kockum Industries, Inc. and various other manufacturers.

Repositioning means, which can be either cam surfaces 76 on the line bars 50 or cams on the return side of the conveyor (not shown), are provided for recentering each load-engaging portion 40 before it circulates into position to engage the next log.

General Operation

Referring to FIG. 3, a log L2 is transported by the standard conveyor 12 in the direction of arrow 13. Log L2 is shown as it approaches the adjustable infeed conveyor 10. Log L2 first passes through the shape sensor 64 which records information about the log L2 for use in positioning it. Log L2 continues to the log rotators 18 and is rotated in accordance with signals from the shape sensor 64. As log L2 passes the rotators 18 it is engaged by a first flight 30a circulating from the return side of conveyor 10. As log L2 moves along the conveyor 10, successive flights 30 engage and hold it on the conveyor 10, in the manner shown with respect to log L1 in FIG. 1.

The log continues to travel along conveyor 10 until it reaches the position of log L1 in FIG. 1, where its entire length is supported on conveyor 10. The centerline 70 of the log L1 is substantially aligned with the centerline 72 of the conveyor 10 (FIG. 4), which is itself aligned with the processing stages 14, 16.

In FIG. 2, log L1 continues to move toward the processing stages 14, 16 until its leading end passes between photocell sensors 62, breaking the light beam between the sensors 62 and causing the sensors 62 to produce a triggering signal. The triggering signal actuates the cylinders 60 causing them to push the line bars 50 into engagement with the load-engaging portions 40 of flights 30. Information from the shape sensor 64 controls the cylinders 60 causing each of them to push each end of each line bar 50 a distance calculated to position the load-engaging portions for optimum cutting of log L1. In FIGS. 2 and 5, log L1 is shown in a selected position with its centerline 70 laterally offset and angularly skewed from the centerline 72 of conveyor 10.

In the preferred embodiment there is no change in the speed of forward movement of the log L1 on the conveyor during the positioning step of FIGS. 2 and 5.

However, the ability to position log L1 while it is moving involves certain timing constraints, particularly the speed of the conveyor relative to the speed of the cylinders 60 and line bars 50 in positioning load-engaging portions 40. Thus, if the conveyor 10 is operated at a high speed it is necessary to momentarily slow or stop it while the log is being positioned. Therefore, the triggering signal from sensors 62 also controls the forward movement of conveyor chains 20.

Once the log L1 is positioned as shown in FIGS. 2 and 5, the cylinders retract the line bars to the disengaged position shown in FIGS. 3 and 4. Log 1 is then carried forward into the processing stage 14, 16, while being held in its selected orientation by the load-engaging portion 40 as shown in FIG. 3. Meanwhile, a second log L2 enters conveyor 10 in preparation for positioning.

Laterally Adjustable Flight

Referring to FIGS. 4-7, each flight 30 includes a base portion 32 and a load-engaging portion 40.

The base portion 32 includes two parallel, elongated, transverse angle members 33 joined at their opposite ends by bolts 34 which also pass through spacer blocks 35 sandwiched between the angle members. Blocks 35 are extensions of the mounting means 21. The spacers 35 and parallel, inwardly-opposed flat side faces 38 of the transverse members 33 define a transverse rectangular space 36, within which the load-engaging portion 40 is carried.

Figure 6:
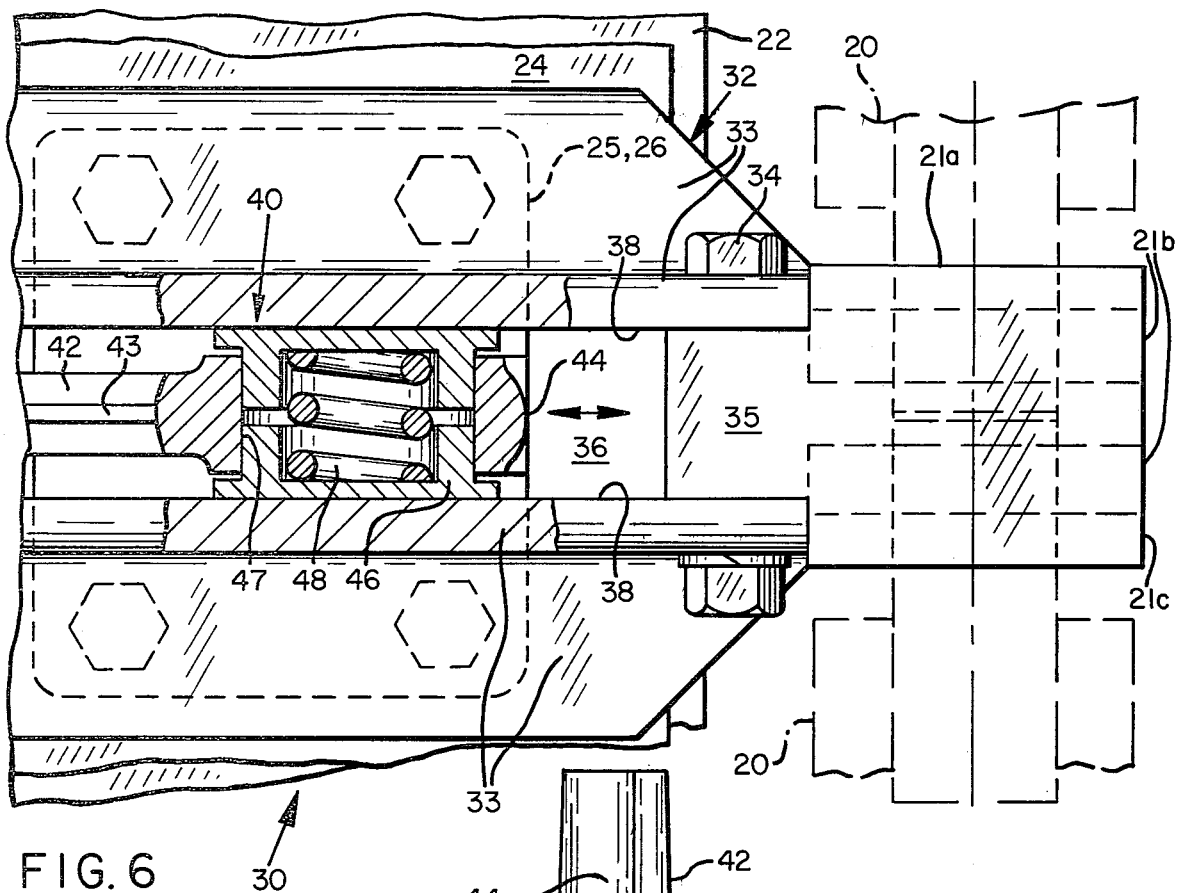
FIG. 6 is an enlarged top plan view of one end of a laterally adjustable flight according to the invention. Part of the flight is cut away along line 6—6 in FIG. 4 to show internal construction.
Figure 7:
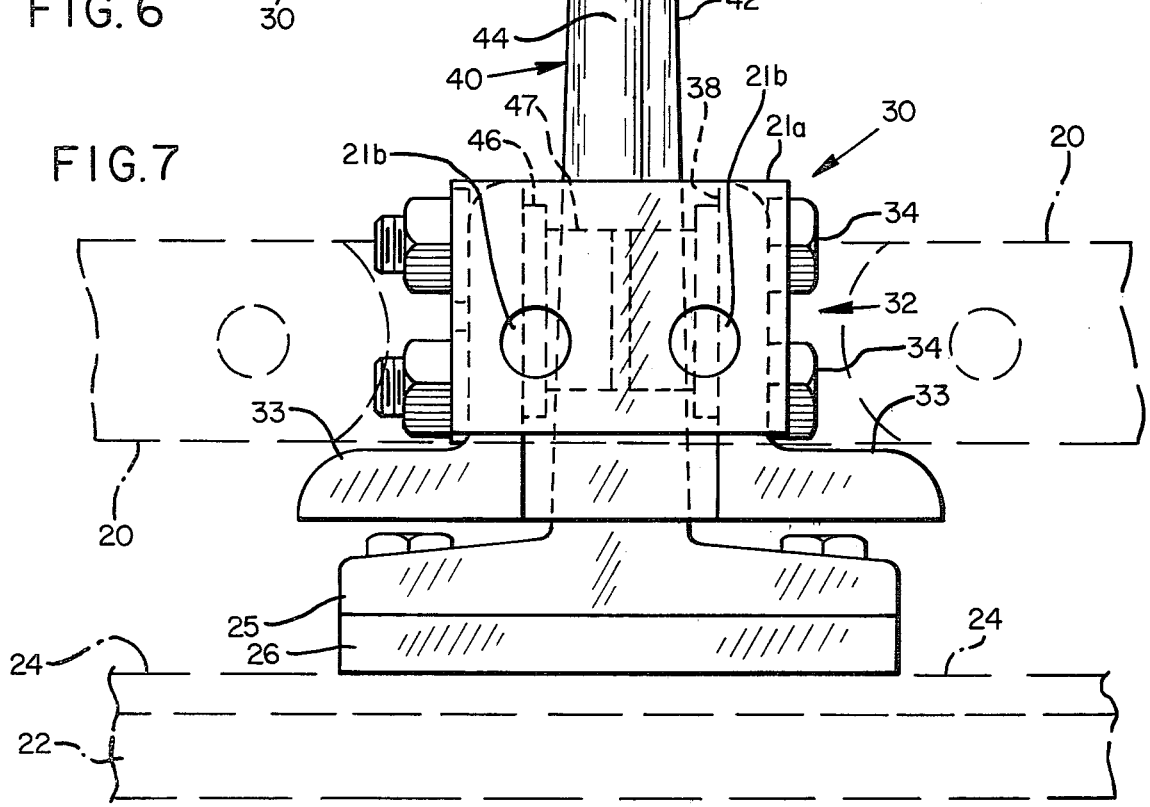
FIG. 7 is an end elevational view of the flight of FIG. 6 with the conveyor partially shown in phantom lines.

In FIGS. 6 and 7, base portion 40 is designed to be mounted transversely of the conveyor path with each end affixed by mounting means 21 to a conveyor chain 20. Mounting means 21 comprises a channel member 21a designed to receive end portions of links of chain 20 within its channel.

Two pins 21b pivotally connect member 21a as an integral segment of chain 20, each pin passing through member 21a and an end portion of one link in the chain. Pins 21b are slightly shorter than the width of member 21a, so that they will not protrude, and are held in place by snap rings.

Spacer 35 extends inwardly from the channel member 21b toward base portion 32 and is sandwiched between members 33 as described above. Opposite spacer 35, channel member 21b has a flat outer face 21c designed for low-frictional movement along flight guides 23 mounted on the conveyor's supporting framework 22a (FIGS. 4 and 5). Flight guides 23 are provided to maintain the lateral position of the base portion 32 of each flight 10 when load-engaging portions 40 are being pushed laterally. The flight guides 23 are lined with UHMW plastic strips 29 to facilitate low-friction movement of the flights 30 along the conveyor 10.

Each load-engaging portion 40 has two flanged feet 25 which slidingly support portion 40 on the conveyor's stationary gliding surfaces 24, and a vertically extending member 42 forming a generally V-shaped trough for cradling log L1.

The undersides of feet 25 have low-friction pads 26, preferably composed of ultra-high molecular weight plastic (UHMW), which contact the gliding surface 24 of the guide flanges 22b of the conveyor's supporting framework.

In the vertically extending member 42, the trough is provided with a ridge 43, best seen in FIG. 6; such ridge 43 functioning to reduce the effect of knots and other irregularities upon the position of log L1. Vertically extending member 42 is also provided on both lateral sides with flat side faces 44 for slidingly contacting a line bar 50 when the lateral position of load-engaging portion 40 is to be adjusted. Each line bar 50 is also provided with UHMW strip 54 to reduce friction when the line bars engage the faces 44 of portions 40, best seen in FIGS. 4 and 5.

Each load-engaging portion 40 has two pairs of friction blocks 46, preferably made of brass, for holding portion 40 in lateral position in transverse space 36. Referring to FIGS. 6 and 7, each pair of blocks 46 is mounted in a circular aperture 47 through the vertically extending member 42. Such apertures 47 are symmetrically positioned about and laterally displaced from the center line 70 of load-engaging portion 40.

Friction blocks 46 each have a hollow cylindrical body whose outer diameter is slightly less than the diameter of aperture 47 and whose inner diameter is sufficient to receive spring 48. Each block 46 also has a cylindrical cap at one end, whose diameter is larger than the diameter of aperture 47, and whose outer face is a flat, smooth surface.

In an assembled flight 30 the load-engaging portion 40 is contained in space 36 of base portion 32 with the vertically extending member 42 protruding above the base portion and the feet 25 extending below the base portion. Pairs of friction blocks 46 are mounted in their respective apertures with their hollow body portions inwardly opposed and containing spring 48. Spring 48 urges blocks 46 apart, compressing their opposite outer faces against the inwardly opposed sides 38 of transverse members 33 and thereby frictionally interengaging base portion 32 to hold load-engaging portion 40 in lateral position.

The amount of friction necessary to hold portion 40 in position will vary with the magnitude of lateral forces of a lumber processing stage against a log. For example, a chipping edger produces much greater lateral force than a band saw. Thus, the surface area and material of friction blocks 46 can vary with application, as can the force of spring 48. Consequently, the force required to shift the load-engaging portions 40 will also vary.

Operation of Laterally Adjustable Flight

Referring to FIGS. 4 and 5, when a laterally adjustable flight 30 is mounted in a conveyor 10, the base portion 32 is supported by the conveyor frame portions 22a. The load-engaging portion 40 is supported by feet 25 upon the gliding surface 24 of guide flange 22b of the conveyor's frame.

When a log, such as log L2 shown in FIG. 3, enters the conveyor 10 from Boxholm conveyor 12 it is engaged by the load-engaging portion 40 of flight 30a. Log L2 is cradled in the trough of vertically extending member 42 and rests on ridges 43 in a position generally centered both on flight 30a and conveyor 10. As the log L1 progresses along the conveyor successive flights 30 engage the log as described above. As log L1 moves along the conveyor path, feet 25 of load-engaging portions 40 bear the weight of portions 40 and log L1 supported thereon, and slide along gliding surface 24. Low friction pads 26 enable low friction movement even when portion 40 supports a heavy log.

When load engaging portions 40 are aligned, line bars 50 momentarily engage such portions 40 along faces 44 and push against portions 40, moving successive portions 40 along the length of log L1 to progressively increasing lateral displacements from conveyor center line 72, thereby laterally and angularly repositioning log L1 as shown in FIG. 2.

Referring to FIG. 5, flight guides 23 prevent lateral movement of base portions 32 so that, when the pressure of the line bars 50 against load-engaging portions 40 is sufficiently great, the static friction between friction blocks 46 and the sides 38 of base portion 32 is overcome and load-engaging portion 40 slides laterally within transverse space 36.

Such pressure does not significantly impede the forward motion of the conveyor because of the low friction interfaces between the UHMW strips 54 of line bars 50 and the side faces 44 of portions 40, and between the UHMW strips 29 of flight guides 23 and the outer face 21c of flight mounting means 21. Similarly UHMW pads 26 on the feet 24 of portions 40 permit such portions to easily slide laterally across bearing surfaces 24.

After log L1 is repositioned, it is carried toward the processing stages 14, 16 (FIG. 3). As the forward portions of log L1 are being processed rearward portions maintain their selected lateral positions in the load-engaging portions 40, which are held in position by static friction of the friction blocks 46 against sides 38 of the base portion.

As each flight 30 reaches the discharge end of conveyor 10 it disengages from log L1 and circulates back to the intake end where its load-engaging portion 40 is recentered prior to engaging the next log, thus completing one cycle.

Having illustrated and described the principles of my invention by what is presently a preferred embodiment thereof, it will be apparent that such embodiment may be modified in arrangement and detail without departing from such principles. I claim all such modifications within the true spirit and scope of the following claims:

1. A conveyor system comprising:
   endless flexible conveyor means movable along a conveyor path;
   multiple flight means spaced apart along said path, each said flight means including a base portion and a load-engaging portion, said load-engaging portion being movable relative to said base portion transversely between a centered position in said path and a position laterally offset from said centered position; and
   a line bar extending lengthwise along the conveyor path;
   the line bar being movable transversely to said path to laterally engage said load-engaging portion to move said load-engaging portion to a selected lateral position;
   whereby an object supported on said flight means can be transported on said conveyor means along said path and laterally reoriented with respect to said path.

2. A conveyor system according to claim 1 including control means for sensing the position of an object transported on said conveyor means and actuating said line bar in response to said sensing to control the lateral positioning of said load-engaging portions.

3. A conveyor system according to claim 1 including holding means for retaining said load-engaging portion in a selected lateral position until urged to a new lateral position, said line bar being operable to override said holding means.

4. A conveyor system according to claim 1 wherein said line bar is operable to engage and then disengage said load-engaging portion while said conveyor means is in motion to reposition said load-engaging portion.

5. A conveyor system according to claim 1 wherein said line bar is operable to move the load-engaging portions of successive flight means simultaneously to different lateral positions with respect to said conveyor path.

6. A conveyor system according to claim 1 wherein said line bar comprises a pair of laterally opposed line bars, one along each of the opposite sides of said conveyor means.

7. A conveyor system according to claim 1 in which said line bar is movable from a position parallel to said conveyor to a position askew of said path to move a first load-engaging portion to a first lateral position and a second load-engaging portion to a second lateral position.

8. A conveyor system comprising:
   endless flexible conveyor means movable along a conveyor path;
   multiple flight means spaced apart along said path and connected to said conveyor means for movement therewith, each said flight means including a base portion and a load-engaging portion, the load-engaging portion being movable relative to the base portion transversely between a centered position in said path and a position laterally offset from said centered position;
   holding means for retaining said load-engaging portion in a selected lateral position until urged to a new lateral position; and
   a pair of laterally opposed line bars, one along each of the opposite sides of said conveyor means;
   said line bars having mutually opposing faces between which said flight means move on said conveyor path;
   said opposing faces being slidingly engagable with opposite side faces of said load-engaging portions to override said holding means to laterally reposition said load-engaging portions.

9. A conveyor system comprising:
   endless flexible conveyor means movable along a conveyor path;
   multiple flight means spaced apart along said path and connected to said conveyor means for movement therewith, each said flight means including a base portion and a load-engaging portion, the load-engaging portion being movable relative to the base portion transversely between a centered position in said path and a position laterally offset from said centered position;
   holding means for retaining said load-engaging portion in a selected lateral position until urged to a new lateral position; and
   a pair of laterally opposed line bars, one along each of the opposite sides of said conveyor means; and
   powered means operable to laterally move each set of ends of said line bars a selectable distance, to move any of said load-engaging portions engaged by said line bars and override said holding means to laterally reposition said load-engaging portions.

10. A conveyor system comprising:
    endless flexible conveyor means movable along a conveyor path;
    multiple flight means spaced apart along said path and connected to said conveyor means for movement therewith, each said flight means including a base portion and a load-engaging portion, the load-engaging portion being movable relative to the base portion transversely between a centered position in said path and a position laterally offset from said centered position;

holding means for retaining said load-engaging portion in a selected lateral position until urged to a new lateral position;

a pair of laterally opposed line bars, one along each of the opposite sides of said conveyor means; and powered means operable to move said line bars into engagement with multiple load-engaging portions of the said flights to override said holding means and to simultaneously move said portions to different lateral positions with respect to said conveyor path.

11. A conveyor system comprising:

endless flexible conveyor means movable along a conveyor path;

multiple flight means spaced apart along said path; and a stationary bearing surface means along said path;

said flight means including a base portion connected to said conveyor means and a load-engaging portion movable relative to said conveyor means transversely of said path;

the load-engaging portion including bearing means for supporting the load-engaging portion on said surface means for movement both along and transversely of said conveyor path.

12. A conveyor system according to claim 11 including friction block means biasedly interengaging said base and load-engaging portions for retaining said load-engaging portion in a selected lateral position until urged to a new lateral position.

13. A conveyor flight for a flighted conveyor having endless flexible conveyor means movable along a path, comprising:

a base portion including two transverse members joined at their opposite ends by spacer means to define a space therebetween, said members having inwardly-opposed transversely-extending parallel sides bounding said space;

a load-engaging portion contained between said members and transversely movable within said space between said spacer means; and friction block means carried by said load-engaging portion and urged against said transverse member by a spring to interengage said portions to frictionally hold the load-engaging portion in a selected lateral position within said space.

14. A conveyor flight for a flighted conveyor having endless flexible conveyor means movable along a path, comprising:

a base portion connected to said conveyor means; and a load-engaging portion movable relative to said base portion transversely of said path;

the load-engaging portion including low-friction bearing means for supporting said portion on a stationary bearing surface means extending along said path.

15. A flight according to claim 14 wherein said bearing means includes low-friction pad means.

16. A flight according to claim 14 including friction block means carried by said load-engaging portion and urged against said base portion by a spring for frictionally interengaging said portions.

17. A conveyor system comprising:

endless flexible conveyor means movable along a conveyor path, multiple flight means spaced apart along said path, each flight means including a base portion connected to the conveyor means, a laterally movable load-engaging portion and a friction block yieldably interengaging said portions to hold the load-engaging portion in a selected lateral position until urged to a different lateral position;

a stationary bearing surface extending along said path slidingly supporting said load-engaging portions; and a pair of line bars extending along opposite sides of the conveyor path and operable to engage a lateral side of at least one of said load-engaging portions to override the friction block and urge said load-engaging portion to a different lateral position.

* * * * *